US012261993B2

(12) United States Patent
Chuang et al.

(10) Patent No.: US 12,261,993 B2
(45) Date of Patent: Mar. 25, 2025

(54) STEREOSCOPIC DISPLAY SYSTEM AND CONTROL METHOD THEREOF

(71) Applicant: Coretronic Corporation, Hsin-Chu (TW)

(72) Inventors: Chun-Hsiung Chuang, Hsin-Chu (TW); Yen-Mo Yu, Hsin-Chu (TW); Wen-Chen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/946,059

(22) Filed: Sep. 16, 2022

(65) Prior Publication Data

US 2023/0086801 A1 Mar. 23, 2023

(30) Foreign Application Priority Data

Sep. 23, 2021 (CN) .......................... 202111112258.7

(51) Int. Cl.
*H04N 13/363* (2018.01)
*H04N 13/324* (2018.01)
*H04N 13/344* (2018.01)
*H04N 13/398* (2018.01)

(52) U.S. Cl.
CPC ......... *H04N 13/363* (2018.05); *H04N 13/324* (2018.05); *H04N 13/344* (2018.05); *H04N 13/398* (2018.05)

(58) Field of Classification Search
CPC .. H04N 13/363; H04N 13/324; H04N 13/344; H04N 13/398; H04N 13/341

USPC ............................................................ 348/53
See application file for complete search history.

(56) References Cited

U.S. PATENT DOCUMENTS

| 2005/0225630 | A1* | 10/2005 | Childers | H04N 13/324 348/51 |
| 2007/0195408 | A1* | 8/2007 | Divelbiss | H04N 13/359 359/462 |
| 2007/0247709 | A1* | 10/2007 | Karakawa | H04N 13/324 348/E13.058 |
| 2008/0129900 | A1* | 6/2008 | Sharp | H04N 9/3111 348/E13.033 |
| 2011/0115993 | A1* | 5/2011 | Liu | G03B 35/18 349/13 |
| 2012/0050266 | A1* | 3/2012 | MacNaughton | H04N 13/341 359/464 |
| 2012/0249967 | A1* | 10/2012 | Su | H04N 13/363 353/121 |

FOREIGN PATENT DOCUMENTS

| TW | 201602639 | 1/2016 |
| TW | 201814683 | 4/2018 |

* cited by examiner

*Primary Examiner* — Tung T Vo
(74) *Attorney, Agent, or Firm* — JCIPRNET

(57) ABSTRACT

A stereoscopic display system and a control method of the stereoscopic display system are provided. A rotation device is controlled to rotate at 2n times an image input frequency, so that the rotation device respectively completes n rotations during a period in which stereoscopic glasses receive a left-eye image and a period in which the stereoscopic glasses receive a right-eye image.

13 Claims, 4 Drawing Sheets

STEREOSCOPIC DISPLAY SYSTEM AND CONTROL METHOD THEREOF

CROSS-REFERENCE TO RELATED APPLICATION

This application claims the priority benefit of China application serial no. 202111112258.7, filed on Sep. 23, 2021. The entirety of the above-mentioned patent application is hereby incorporated by reference herein and made a part of this specification.

BACKGROUND OF THE INVENTION

1. Field of the Invention

The invention relates to a display apparatus; more particularly, the invention relates to a stereoscopic display system and a control method thereof.

2. Description of Related Art

With the advancement of display technology, displays that support three-dimensional (3D) image playback technologies have become more and more popular. The difference between a 3D display and a two-dimensional (2D) display lies in that the 3D display technology allows a viewer to perceive 3D shapes of objects in the image, such as 3D facial features of a character and a depth of field, while the conventional 2D images cannot accomplish such an effect. The principle behind the 3D display technology is to allow a left eye of the viewer to watch a left-eye image and a right eye of the viewer to watch a right-eye image, so as to allow the viewer to experience the 3D visual effect. Although the conventional 3D display technology may effectively demonstrate stereoscopic effects, the display quality may still be improved. For instance, when the eyeball of the viewer moves, a color breaking phenomenon may be easily observed (e.g., when a display image is white, the viewer may see three colors of red, green, and blue instead of the mixed white color, which may affect the display quality of the display image.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a stereoscopic display system and a control method thereof, which may effectively improve display quality of stereoscopic images.

Other objectives and advantages of the invention may further be learned from technical features disclosed in the invention.

In order to achieve one or a part or all of the foregoing objectives or other objectives, an embodiment of the invention provides a stereoscopic display system including stereoscopic glasses and a projection device. The projection device is configured to receive an image input signal and output a left-eye image and a right-eye image included in the image input signal to the stereoscopic glasses. The image input signal has an image input frequency. The projection device includes a rotation device and a control circuit. The rotation device is disposed on a transmission path of a light beam and converts the light beam to a color beam. The control circuit is coupled to the rotation device to control the rotation device to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1.

In order to achieve one or a part or all of the foregoing objectives or other objectives, an embodiment of the invention provides a control method of a stereoscopic display system, and the stereoscopic display system includes stereoscopic glasses and a projection device. The projection device includes a rotation device and a control circuit. A control method of the stereoscopic display system includes following steps. An image input signal is received by the projection device, and a left-eye image and a right-eye image included in the image input signal are output by the projection device. The image input signal has an image input frequency. The rotation device is controlled by the control circuit to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1.

In view of the above, the control circuit provided in one or more embodiments of the invention may control the rotation device to rotate at 2n times the image input frequency, so that the rotation device completes n rotations during the period in which the stereoscopic glasses receive the left-eye image and during the period in which the stereoscopic glasses receive the right-eye image, respectively. Here, n is an integer greater than 1. As such, during the period of providing the left-eye image and the right-eye image, the number of rotations of the rotation device is increased, whereby a color change frequency of the images received by the left eye and the right eye may be increased, so as to effectively avoid the color breaking problem without posing a negative impact on the brightness of the images and further effectively improve the display quality of the stereoscopic images.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
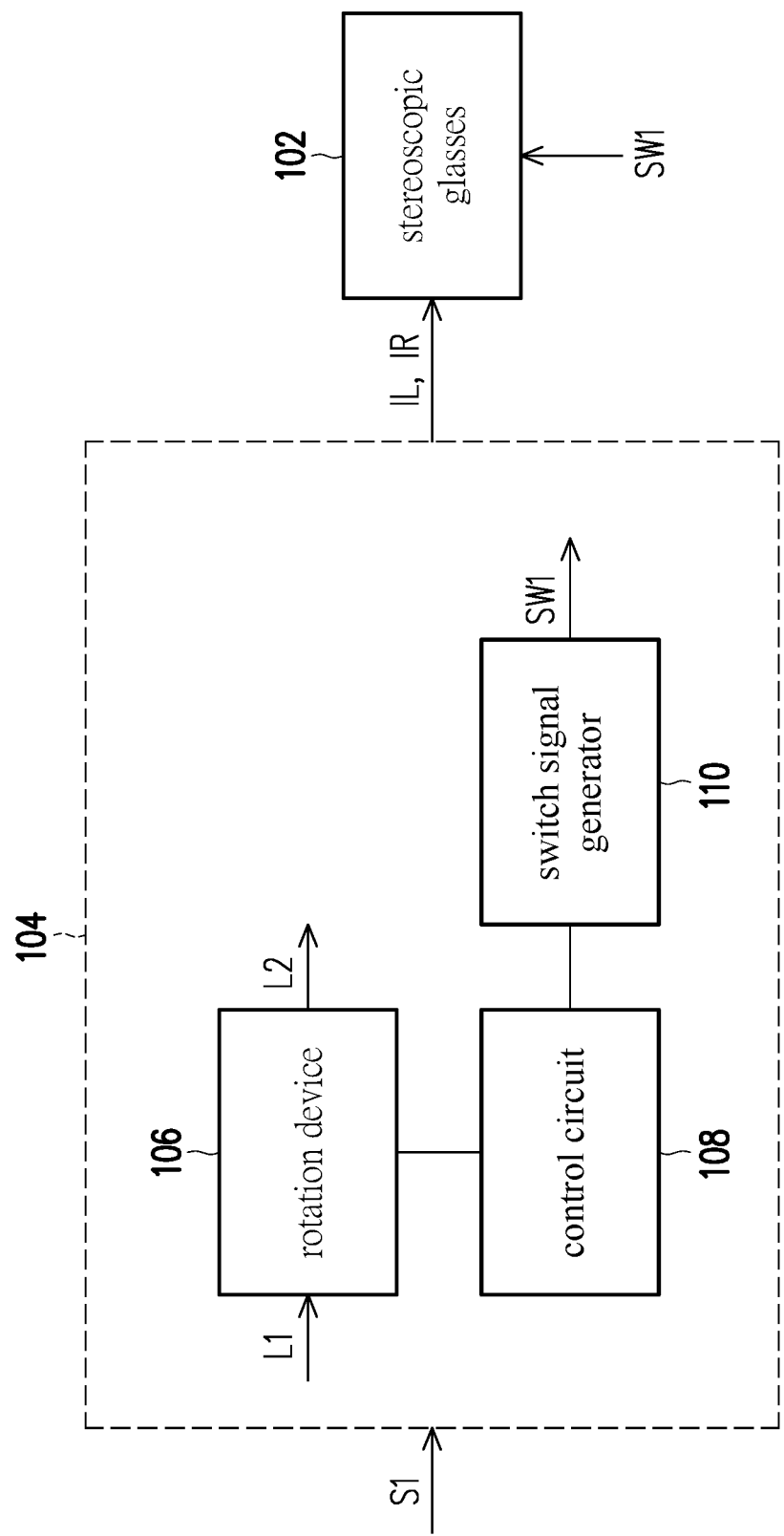
FIG. 1 is a schematic view of a stereoscopic display system according to an embodiment of the invention.

FIG. 1 is a schematic view of a stereoscopic display system according to an embodiment of the invention. With reference to FIG. 1, the stereoscopic display system includes stereoscopic glasses 102 and a projection device 104. The stereoscopic glasses 102 may be active stereoscopic glasses, e.g., shutter stereoscopic glasses, which should however not be construed as a limitation to the invention. The projection device 104 may receive an image input signal S1, and the image input signal S1 is a 3D image signal including a left-eye image IL and a right-eye image IR. The projection device 104 outputs the left-eye image IL and the right-eye image IR to the stereoscopic glasses 102. Here, the image input frequency (i.e., an image refresh rate) of the image input signal S1 may be, for instance, 24 Hz, 48 Hz, 60 Hz, 96 Hz, 120 Hz, 144 Hz, and so on, which should however not be construed as a limitation to the invention. For instance, if the image input frequency of the image input signal S1 is 60 Hz, an image refresh rate of the left-eye image IL and the right-eye image IR is 120 Hz. To be specific, the projection device 104 may include a rotation device 106, a control circuit 108, and a switch signal generator 110. The rotation device 106 is disposed on a transmission path of a light beam L1 to convert the light beam L1 to a color beam L2. The control circuit 108 includes a controllable electronic switch (not shown). In response to the rotation of the rotation device 106, the projection device 104 may provide the left-eye image IL and the right-eye image IR. The rotation device 106 may be, for instance, implemented in form of a color wheel or a phosphor wheel.

The control circuit 108 is coupled to the rotation device 106 and the switch signal generator 110, to control the rotation device to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1.

The control circuit 108 may control a rotation speed of the rotation device 106 according to the image refresh rate of the image input signal S1. For instance, the control circuit 108 may control the rotation device 106 to rotate at 2n times the image input frequency, so that the rotation device 106 may complete n rotations during a period in which the stereoscopic glasses 102 receive the left-eye image IL and during a period in which the stereoscopic glasses 102 receive the right-eye image IR, respectively. Here, n is an integer greater than 1. When the rotation device 106 completes n rotations each time, the control circuit 108 may control the switch signal generator 110 to output a left-eye and right-eye switch signal SW1 in a switch signal output period, so that the stereoscopic glasses 102 blocking one of the left-eye image IL and the right-eye image IR may switch to block the other of the left-eye image IL and the right-eye image IR according to the left-eye and right-eye switch signal SW1, i.e., the stereoscopic glasses 102 receiving one of the left-eye image IL and the right-eye image IR may switch to receive the other.

Figure 2:
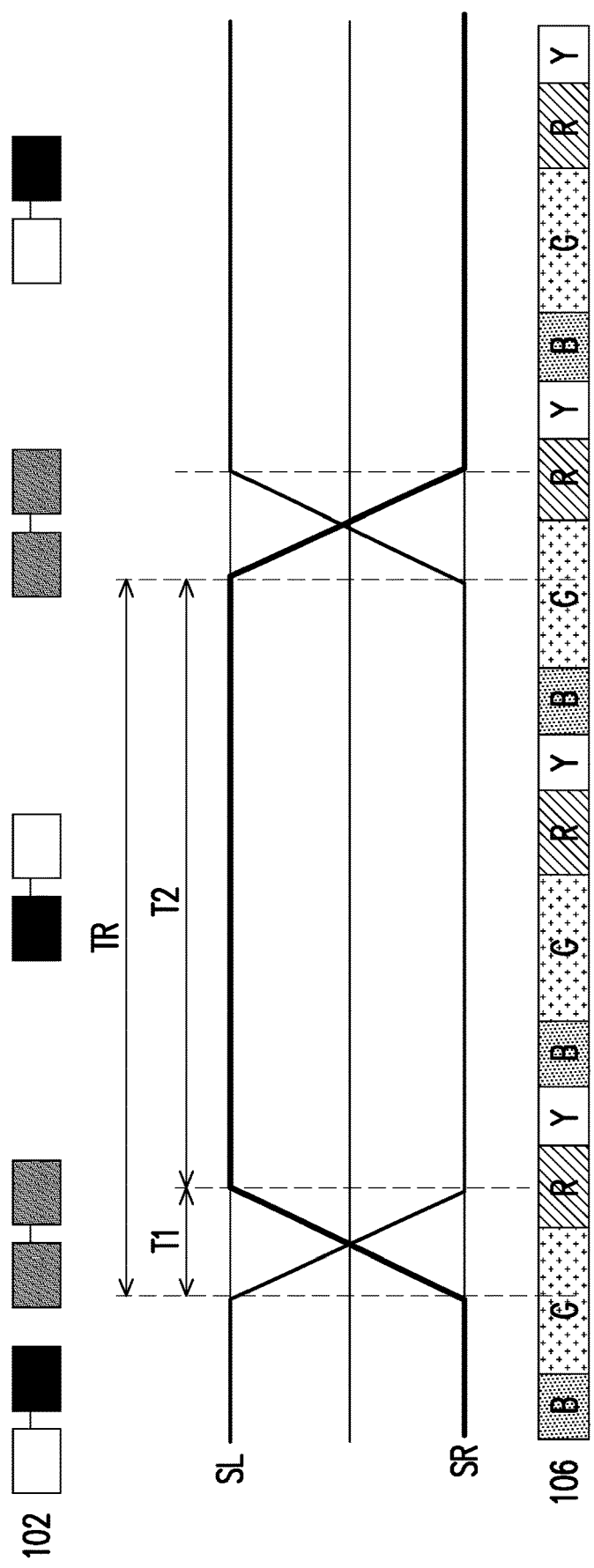
FIG. 2 is a schematic view of driving stereoscopic glasses and a rotation device according to an embodiment of the invention.
Figure 3:
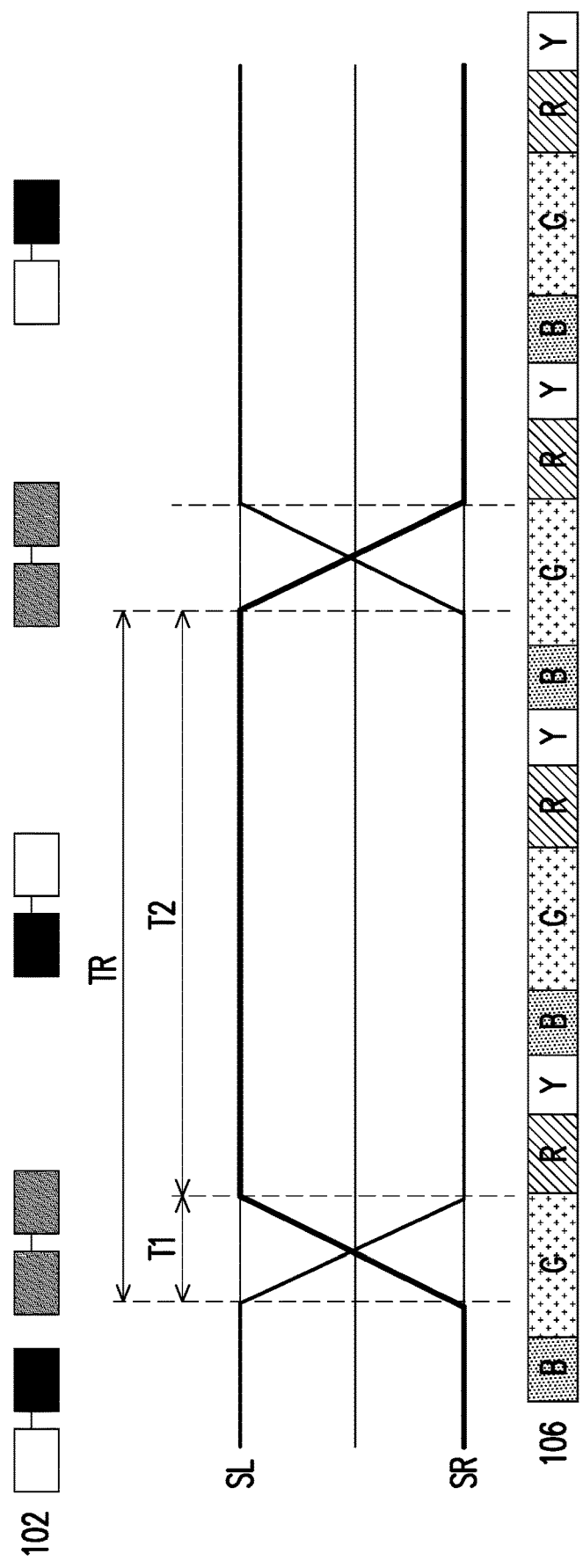
FIG. 3 is a schematic view of driving stereoscopic glasses and a rotation device according to another embodiment of the invention.

For instance, FIG. 2 is a schematic view of driving stereoscopic glasses and a rotation device according to an embodiment of the invention. As shown in FIG. 2, the stereoscopic glasses 102 are controlled by switch control signals SL and SR to block the left-eye image IL or the right-eye image IR. When the switch control signal SL is at a logic high level and the switch control signal SR is at a logic low level, the left-eye image IL may pass through the stereoscopic glasses 102, and the right-eye image IR is blocked by the stereoscopic glasses 102; when the switch control signal SL is at the logic low level and the switch control signal SR is at the logic high level, the right-eye image IR may pass through the stereoscopic glasses 102, and the left-eye image IL is blocked by the stereoscopic glasses 102. Here, the changes to the logic levels of the switch control signals SL and SR are controlled by the left-eye and right-eye switch signal SW1. A period TR during which the projection device 104 provides the right-eye image IR is taken as an example; the period TR during which the projection device 104 provides the right-eye image IR may include a switch signal output period T1 and an image receiving period T2, and in the switch signal output period T1, the stereoscopic glasses 102 are controlled by the switch control signals SL and SR to switch to block the left-eye image or the right-eye image. After the stereoscopic glasses 102 completes the switch of blocking the left-eye image or the right-eye image, in the image receive period T2, the stereoscopic glasses 102 receive the right-eye image IR and block the left-eye image IL.

In this embodiment, the rotation device 106 includes light conversion regions R, Y, B, and G, the colors of which are red, yellow, blue, and green in sequence. The image input frequency of the image input signal S1 is 60 Hz; that is, the image refresh rate of the left-eye image IL and the right-eye image IR is 120 Hz, and a display time of each frame of the left-eye image IL and the right-eye image IR is 8.33 ms. The control circuit 108 may, for instance, control a motor of 240 Hz (n is equal to 2) to drive the rotation device 106, so that the rotation device 106 may complete two rotations every 8.33 ms; namely, the rotation device 106 is rotated twice during the period in which the projection device 104 provides the left-eye image IL and the right-eye image IR, so as to provide the color beam L2 of the R, Y, B, and G colors of the light conversion regions twice. The period TR during which the projection device 104 provides the right-eye image IR is taken as an example. In the period TR, the rotation device 106 may provide red, yellow, blue, green, red, yellow, blue, and green color beam L2 in sequence. Similarly, when the projection device 104 provides the left-eye image IR, the implementation details of the stereoscopic glasses 102 and the projection device 104 are similar to those provided above and thus will not be repeated here.

Thereby, the number of rotations of the rotation device 106 is increased during the period of receiving the left-eye image IL and the right-eye image IR. For instance, in the above-mentioned embodiment, the rotation device 106 is controlled to rotate at a rate 4 times the image input frequency, and the rotation device 106 is controlled to complete two rotations during a period in which the stereoscopic glasses 102 receive the left-eye image IL and during a period in which the stereoscopic glasses 102 receive the right-eye image IR. As such, the color change frequency of the images received by the left eye and the right eye may be increased, the color breaking problem may be effectively prevented without posing a negative impact on the brightness of the images, and the display quality of the stereoscopic images may be further improved in an effective manner.

Note that the stereoscopic display system is described in the previous embodiment on a condition that n is equal to 2. However, in other embodiments, n may be greater than 1 and is not limited to what is provided in the previous embodiment. In addition, in the switch signal output period T1, the light beam L1 irradiates a junction of the light conversion regions of any two of the colors in the rotation device 106 provided in the previous embodiment, so as to mitigate the impact on blocking the left-eye image or the right-eye image when the left-eye image or the right-eye image is blocked in the switch signal output period T1 and uniformize the colors. However, in other embodiments, the light beam may also irradiate any of the light conversion regions in the rotation device 106 during the switch signal output period T1. Besides, in the previous embodiments, the rotation device 106 exemplarily includes the light conversion regions of four colors, which should not be construed as a limitation to the invention; in other embodiments, the rotation device 106 may also include light conversion regions with fewer colors (e.g., red, green, and blue) or more colors.

In addition, in some embodiments, the control circuit 108 may control the rotation speed of the rotation device 106 according to a predetermined image refresh rate. The predetermined image refresh rate may be, for instance, 60 Hz, 96 Hz, 120 Hz, or 144 Hz, which should however not be construed as a limitation to the invention. When the image refresh rate of the image input signal S1 is not equal to the predetermined image refresh rate, the control circuit 108 may switch the image refresh rate of the image input signal S1 to the predetermined image refresh rate and then control the rotation speed of the rotation device 106 according to the predetermined image refresh rate.

Besides, in the previous embodiment, the stereoscopic glasses 102 is, for instance, active stereoscopic glasses. However, in some embodiments, the stereoscopic glasses 102 may also be passive stereoscopic glasses, e.g., passive polarized stereoscopic glasses, which should however not be construed as a limitation to the invention. If the stereoscopic glasses 102 is implemented in form of the passive polarized stereoscopic glasses, the projection device 104 may not include the switch signal generator 110 and may provide the left-eye image and the right-eye image with different polarization states to achieve the effect of blocking the left-eye image or the right-eye image through the stereoscopic glasses 102. The above-mentioned switch signal output period T1 may be a period during which the projection device 104 changes the polarization state of the provided image. Since the implementation manner of the stereoscopic display system of the passive polarized stereoscopic glasses is similar to the implementation manner provided in the above-mentioned embodiment, no further description will be provided hereinafter.

Figure 4:
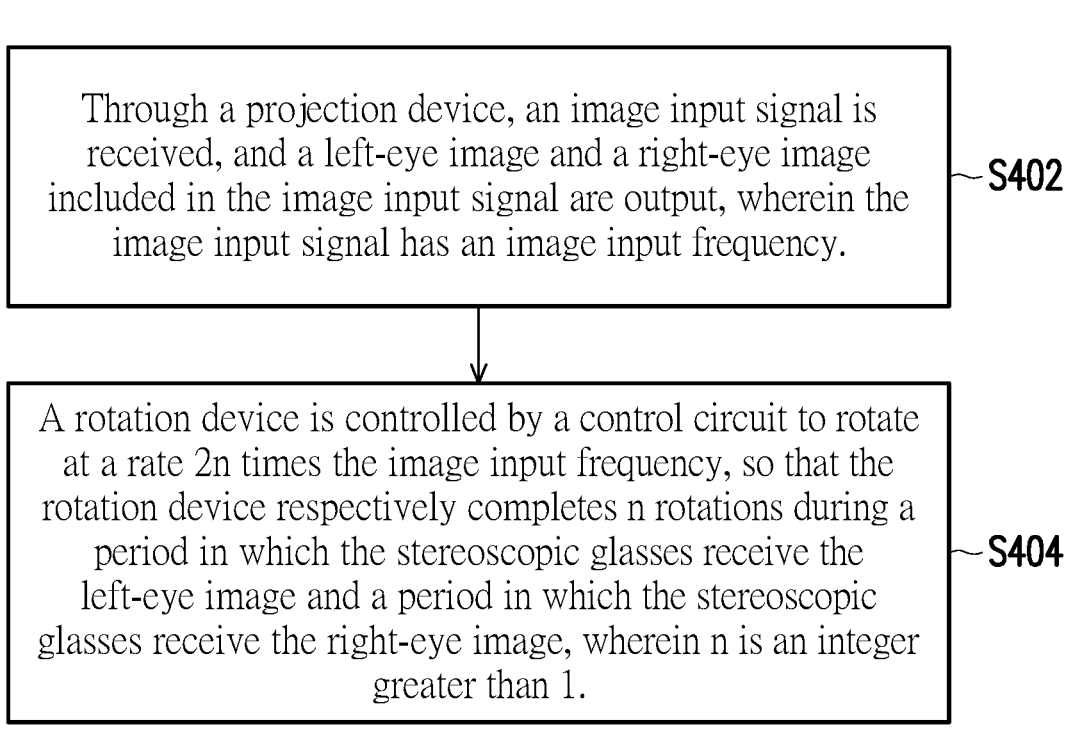
FIG. 4 is a flowchart of a control method of a stereoscopic display system according to an embodiment of the invention.

FIG. 4 is a flowchart of a control method of a stereoscopic display system according to an embodiment of the invention. Here, the stereoscopic display system includes stereoscopic glasses and a projection device, and the projection device includes a rotation device and a control circuit. The stereoscopic glasses may be active stereoscopic glasses or passive stereoscopic glasses. The rotation device may include a plurality of light conversion regions of different colors, e.g., the light conversion regions of red, green, blue, and yellow colors, which should however not be construed as a limitation to the invention. The rotation device may be implemented in form of a color wheel or a phosphor wheel, for instance. According to the previous embodiments, the control method of the stereoscopic display system may at least include following steps. Through the projection device, an image input signal is received, and a left-eye image and a right-eye image included in the image input signal are output. Here, the image input signal has an image input frequency (step S402). The image input frequency of the image input signal may be an image refresh rate of the image input signal. The rotation device is controlled by the control circuit to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1 (step S404). In particular, when the rotation device completes n rotations each time, a left-eye and right-eye switch signal may be output, so that the stereoscopic glasses blocking one of the left-eye image and the right-eye image is switched to block the other of the left-eye image and the right-eye image according to the left-eye and right-eye switch signal. In a switch signal output period, a light beam irradiates a junction of the light conversion regions of any two of the colors or irradiates any of the light conversion regions. In some embodiments, a rotation speed of the rotation device may be controlled according to a predetermined image refresh rate. When an image refresh rate of the image input signal is not equal to the predetermined image refresh rate, the image refresh rate of the image input signal may be switched to the predetermined image refresh rate, and then the rotation speed of the rotation device is controlled according to the predetermined image refresh rate. Here, the predetermined image refresh rate may be, for instance, 60 Hz, which should however not be construed as a limitation to the invention.

To sum up, the control circuit provided in one or more embodiments of the invention may control the rotation device to rotate at 2n times the image input frequency, so that the rotation device completes n rotations during the period in which the stereoscopic glasses receive the left-eye image and during the period in which the stereoscopic glasses receive the right-eye image, respectively. Here, n is an integer greater than 1. As such, during the period of providing the left-eye image and the right-eye image, the number of rotations of the rotation device is increased, whereby a color change frequency of the images received by the left eye and the right eye may be increased, so as to effectively avoid the color breaking problem without posing a negative impact on the brightness of the images and further effectively improve the display quality of the stereoscopic images.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A stereoscopic display system, comprising:
   stereoscopic glasses; and
   a projection device, configured to receive an image input signal and output a left-eye image and a right-eye image included in the image input signal to the stereoscopic glasses, the image input signal having an image input frequency, the projection apparatus comprising:
   a rotation device, disposed on a transmission path of a light beam and converting the light beam to a color beam; and
   a control circuit, coupled to the rotation device to control the rotation device to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1,
   wherein when the image input frequency of the image input signal is not equal to a predetermined value, the control circuit converts the image input frequency to the predetermined value and then controls the rotation device to rotate at the rate 2n times the predetermined value.

2. The stereoscopic display system according to claim 1, wherein the projection device comprises:
   a switch signal generator, coupled to the control circuit, the control circuit controlling the switch signal generator to generate the left-eye and right-eye switch signal in a switch signal output period.

3. The stereoscopic display system according to claim 2, wherein the rotation device comprises a plurality of light conversion regions of different colors, and during the switch signal output period, the rotation device converts the light beam to the color beam of different colors or converts the light beam to the color beam of the same color.

4. The stereoscopic display system according to claim 2, wherein the rotation device comprises light conversion regions of red, green, blue, and yellow colors, and during the switch signal output period, the light beam irradiates a junction of the light conversion regions of any two of the colors.

5. The stereoscopic display system according to claim 1, wherein the predetermined value is 60 Hz, 96 Hz, 120 Hz, or 144 Hz.

6. The stereoscopic display system according to claim 1, wherein the stereoscopic glasses are active stereoscopic glasses or passive stereoscopic glasses.

7. The stereoscopic display system according to claim 1, wherein when the rotation device completes n rotations each time, the control circuit outputs a left-eye and right-eye switch signal, and the stereoscopic glasses blocking one of the left-eye image and the right-eye image is switched to block the other of the left-eye image and the right-eye image according to the left-eye and right-eye switch signal.

8. A control method of a stereoscopic display system, the stereoscopic display system comprising stereoscopic glasses and a projection device, the projection device comprising a rotation device and a control circuit, the control method of the stereoscopic display system comprising:
   receiving an image input signal by the projection device and outputting a left-eye image and a right-eye image included in the image input signal by the projection device, the image input signal having an image input frequency; and
   controlling the rotation device by the control circuit to rotate at a rate 2n times the image input frequency, so that the rotation device respectively completes n rotations during a period in which the stereoscopic glasses receive the left-eye image and a period in which the stereoscopic glasses receive the right-eye image, wherein n is an integer greater than 1,
   wherein when the image input frequency of the image input signal is not equal to a predetermined value, the control circuit converts the image input frequency to the predetermined value and then controls the rotation device to rotate at the rate 2n times the predetermined value.

9. The control method according to claim 8, wherein the rotation device comprises a plurality of light conversion regions of different colors, and during a switch signal output period, a light beam irradiates a junction of the light conversion regions of any two of the colors.

10. The control method according to claim 8, wherein the rotation device comprises light conversion regions of red, green, blue, and yellow colors, and during a switch signal output period, the rotation device converts a light beam to a red color beam and a green color beam.

11. The control method according to claim 8, wherein the predetermined value is 60 Hz, 96 Hz, 120 Hz, or 144 Hz.

12. The control method according to claim 8, wherein the stereoscopic glasses are active stereoscopic glasses or passive stereoscopic glasses.

13. The control method according to claim 8, further comprising:
   when the rotation device completes n rotations each time, a left-eye and right-eye switch signal is output by the control circuit, and the stereoscopic glasses blocking one of the left-eye image and the right-eye image is switched to block the other of the left-eye image and the right-eye image according to the left-eye and right-eye switch signal.

\* \* \* \* \*